United States Patent
Stimmel et al.

(10) Patent No.: US 8,395,081 B2
(45) Date of Patent: Mar. 12, 2013

(54) METHOD AND MONITORING DEVICE FOR WELDING BY MEANS OF A POSITIONING DEVICE

(75) Inventors: Burkhard Stimmel, Achmuehle (DE); Dirk Jacob, Augsburg (DE)

(73) Assignee: Kuka Roboter GmbH, Augsburg (DE)

( * ) Notice: Subject to any disclaimer, the term of this patent is extended or adjusted under 35 U.S.C. 154(b) by 344 days.

(21) Appl. No.: 12/765,104

(22) Filed: Apr. 22, 2010

(65) Prior Publication Data
US 2010/0270272 A1 Oct. 28, 2010

(30) Foreign Application Priority Data

Apr. 22, 2009 (DE) .......................... 10 2009 018 403
Oct. 14, 2009 (DE) .......................... 10 2009 049 327
Oct. 14, 2009 (DE) .......................... 10 2009 049 329

(51) Int. Cl.
*B23K 5/00* (2006.01)
(52) U.S. Cl. ................ 219/121.67; 219/121.41
(58) Field of Classification Search ................ 219/86.7, 219/86.51, 109, 110, 121.63, 67, 72
See application file for complete search history.

(56) References Cited

U.S. PATENT DOCUMENTS

| | | | |
|---|---|---|---|
| 4,484,056 A | 11/1984 | Rossell | |
| 4,655,675 A * | 4/1987 | Yasuoka | 414/735 |
| 4,755,232 A * | 7/1988 | Thones et al. | 148/195 |
| 5,145,312 A * | 9/1992 | Sonoda et al. | 414/719 |
| 5,471,028 A * | 11/1995 | Kawai | 219/110 |
| 5,484,975 A * | 1/1996 | Itatsu | 219/86.7 |
| 5,504,298 A * | 4/1996 | Rossi | 219/109 |
| 5,988,486 A | 11/1999 | Kobayashi et al. | |
| 6,130,396 A * | 10/2000 | Hasegawa et al. | 219/110 |
| 6,403,917 B1 * | 6/2002 | Helldorfer | 219/121.63 |
| 2004/0129759 A1* | 7/2004 | Rouault et al. | 228/102 |
| 2009/0069936 A1 | 3/2009 | Kock et al. | |
| 2010/0270277 A1* | 10/2010 | Matsumoto et al. | 219/121.72 |
| 2010/0274388 A1* | 10/2010 | Hagenauer | 700/250 |
| 2011/0278265 A1* | 11/2011 | Kessler et al. | 219/121.63 |
| 2011/0282483 A1* | 11/2011 | Simonetti et al. | 700/114 |

\* cited by examiner

*Primary Examiner* — Michael Lebentritt
(74) *Attorney, Agent, or Firm* — Schiff Hardin LLP

(57) ABSTRACT

In a method and device for automated welding using a positioning device, in particular a welding robot, a welding pose is occupied by the positioning device in a regulated manner, and the welding pose is flexibly held during the closing of an electrode holder, during the welding process and/or during the opening of the electrode holder.

9 Claims, 1 Drawing Sheet

METHOD AND MONITORING DEVICE FOR WELDING BY MEANS OF A POSITIONING DEVICE

BACKGROUND OF THE INVENTION

1. Field of the Invention

The present invention concerns a method and a monitoring device for welding by means of a positioning device, in particular a welding robot.

2. Description of the Prior Art

In resistance spot welding (RSW), plates that are to be joined, for example, are pressed together by two welding electrodes and a welding current is conducted through the electrodes and the plates, wherein due to the increased transfer resistance between the plates their temperature is increased so much that the plates melt there.

If this is executed automatically by a positioning device (for example a welding robot), this device takes up predetermined poses in a position-regulated manner in order to position electrode holder and work piece(s) relative to one another. For this the positioning device can move the work piece and/or the electrode holder. For example, a welding robot can apply a robot-guided electrode holder to a stationary work piece or, conversely, can supply a gripped work piece to a stationary electrode holder.

In the approach and/or in the welding pose, the electrode holder is closed and a welding spot is generated via movement of at least one electrode towards the other electrode. The poses to set the welding spots can, for example, be "learned" in advance with manual operation or can be programmed offline and, for example, be occupied with the use of proportional-integral-differential single joint regulators.

If in operation the position (i.e. bearing and/or orientation) of a work piece to be welded relative to a tool reference system of the positioning device—for example the TCP ("tool center point")—of a welding robot now deviates from the position relative to which the pose was predetermined—for example since plates are deformed or imprecisely mounted in a feeder tool or feeder tool and positioning device are positioned imprecisely relative to one another—the position regulation attempts to forcibly reach the reference position. In particular given high strength and super high strength plates, this can thereby lead to a degradation or, respectively, a failure of the welding process, a damage to work piece, tool and/or positioning device and the like.

Therefore, in practice electrode holders borne in a floating manner have previously been provided that decouple the electrode holder from transversal forces during the welding process. In particular given non-stationary, directed electrode holders, to approach the next pose what is known as the holder compensation must be fixed in order to be able to position the electrode holder precisely. This entails difficult, complicated, power-consuming and error-prone mechanisms.

SUMMARY OF THE INVENTION

An object of the present invention is to improve automated welding.

The present invention causes a positioning device, in particular a welding robot to occupy one or more welding poses in a regulated manner. As used herein, "regulation" means the determination and output of manipulated variables—for instance desired drive forces and/or moments, currents, powers or the like—by drive units of the positioning device (for example electromotors) that ensue on the basis of returned real variables, in particular poses, joint positions and/or joint velocities. For example, for this purpose a single joint regulation (for instance PID regulation) can be provided that determines the manipulated variables proportional to a regulation difference between desired and real joint positions and/or time derivatives and/or integrals of these. The regulation can similarly ensue in Cartesian space via comparison of desired and real position (or their time derivatives and/or integrals) and/or based on models.

According to the invention, a welding pose of the positioning device that is occupied during the closing of an electrode holder, during the welding process and/or during the opening of the electrode holder (subsequently designated collectively as an activation of the electrode holder) is now held flexibly by means of software. The positioning device that is "soft"-switched in such a manner in terms of its monitoring can then loosen reaction forces (that act on the electrode holder due to incorrect positionings upon approaching the work piece) by changing its pose and thus make adjustment with regard to the actual work piece position so that a more complicated mechanical holder compensation (which previously compensated between the rigidly position-regulated positioning device remaining in its reference pose and the offset work piece) can be omitted.

In an advantageous embodiment, for this purpose the welding pose can be held in a controlled manner. In contrast to the regulation explained above, what is thereby understood by a control is in particular the determination and output of manipulated variables independent of real variables, in particular joint positions.

For this purpose, in a preferred embodiment of the present invention a position regulation with which the welding pose is precisely occupied can be suppressed upon closing the electrode holder, during the welding process and/or upon opening the electrode holder, for example in that regulation differences are zeroed or desired variables are set to real variables so that no contouring errors exist. If the position regulation possesses a pilot control, this can furthermore remain active. It can advantageously be possible to switch between a regulation with consideration of reset poses or positions of the positioning device and a control without.

In a preferred embodiment, the controller can compensate for predetermined forces (in particular weights) that, for example, act on the positioning device in that, for example, the manipulated variables—for instance drive forces or, respectively, moments, currents or the like—that are required for this are determined and stored in advance and are used to activate the actuators of the positioning device during the activation of the electrode holder.

A controller (in particular position controller) in the sense of the present invention can also possess a subordinate regulation layer (for instance in the form of a current regulator or the like) that relates to the differentiation between (position) regulation and (position) control, in particular insofar as whether poses or, respectively, joint positions of the position device are reset and taken into account (regulation) or not (control).

If the position regulation is switched to again (at the latest upon or after the opening of the electrode holder) in order to occupy the next welding pose, the current real pose of the positioning device can deviation from the approached desired pose due to its yielding during the activation of the electrode holder, such that an abrupt switch leads to a jump in the regulation deviation and thus to an inducement of oscillation or an activation of a contouring error monitoring. In a preferred embodiment of the present invention, after the flexible holding of the welding pose the current pose is therefore initially used as a desired pose of a regulation (advantageously for a predetermined time period) upon ending the closing or opening of the electrode holder or upon ending the welding process.

If, during the flexible holding of the welding pose, the position regulation does not ensure that the positioning device at least approximately holds its welding pose, in a preferred embodiment the current pose is monitored during the flexible holding of the welding pose. If the difference between this current pose and the welding pose that is taken up and theoretically is to be held is too great, a corresponding reaction can ensue, in particular a halt (advantageously an emergency stop) of the positioning device.

At the point of a suppression of the position regulation (by which is understood in particular a Cartesian pose or, respectively, joint position regulation, as explained in the preceding) this can also be correspondingly modified in order to flexibly hold the welding pose during the activation of the electrode holder. For example, for this manipulated variable limitations (for instance maximum values to which the drive forces and/or moments are limited) can be correspondingly reduced so that the positioning device counters a displacement out of its assumed welding pose due to the contact with the offset work piece with only these reduced maximum values. This advantageously ensues for all movement axles of the positioning device. It is similarly possible to use a force regulation, in particular to switch from position regulation to force regulation, wherein desired force values of the force regulation are preset correspondingly low during the activation of the electrode holder. It can also be sufficient to reduce or to eliminate the integral portion of a PI(D) regulation since the positioning device then counters an evasion due to the contact with the offset work piece only with a force that is proportional to this offset, however does not increase or, respectively, increases only slightly with remaining offset.

DESCRIPTION OF THE PREFERRED EMBODIMENTS

Figure 1:
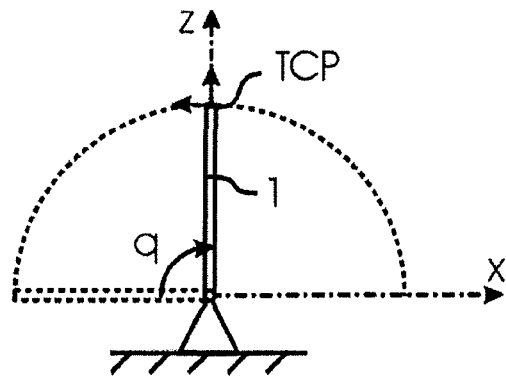
FIG. 1: shows a welding robot with a monitoring device according to one embodiment of the present invention.

FIG. 1 shows a six-axis welding robot 1 with an electrode holder 2 upon spot welding a two-layer work piece 3.

A monitoring device 4 detects the joint or, respectively, motor angle $q=(q1, \ldots, q6)$ of the articulated arm robot 1 (removed in FIG. 1) and outputs desired motor currents $i_s$ to the drive motors (dash-dot line in FIG. 1).

To occupy a welding pose (as it is shown by way of example in FIG. 1), a regulator R of the monitoring device 4 receives desired joint angles $q_{s,\ SPS}$ that it compares with the detected real joint angles q and derives from this regulation difference a corresponding manipulated variable that is converted into corresponding desired motor currents $i_s$ in a current regulator RS that detects the real motor currents i. In addition or as an alternative to the joint angles, joint angle velocities or other time derivatives and/or integrals of the joint angles can also be used in order to realize a PID position regulation, for example. Instead of the joint angles, Cartesian positions of the tool reference system TCP can also be similarly used that can be mapped to one another via forwards or, respectively, backwards transformation (not shown). To occupy a welding pose, crossover switching devices 4.1, 4.2 are accordingly, respectively in the position "①".

Figure 2:
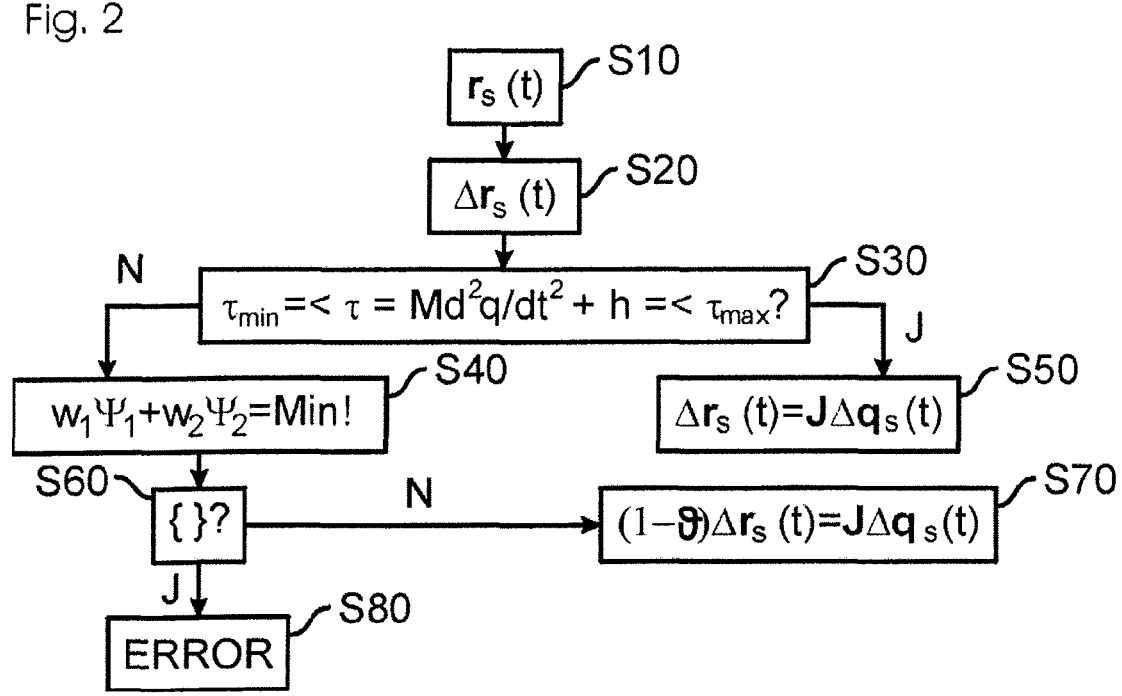
FIG. 2 illustrates a method for welding by means of the welding robot, executed via the monitoring device according to FIG. 1.

If the robot has taken up the taught [sic] welding pose $q_t$ (FIG. 2: S10: "Y"), the crossover switching device 4.2 in Step S20 switches over into the position "②" shown in FIG. 1. The position regulator R is thereby suppressed; the current regulator RS receives as a manipulated variable only a stored desired value $i_t$. This corresponds, for example, to the current value upon switching over to the position controller, i.e. the current that the motors require to hold the assumed welding pose against weight, friction and other forces (i.e. without contact forces of the work piece 3 on the electrode holder 2).

The welding pose is therefore controlled and held flexibly since the manipulated variable for the current regulator RS is no longer determined by the position regulator R depending on the real pose but rather independent of this by the controller S, based on the predetermined current value. Weight and other impressed forces are thereby approximately compensated by this controller, such that the pose of the robot can be varied with correspondingly small external forces.

The holder 2 is now activated (S30: Z=1), i.e. the movable electrode is closed, the welding current is activated and the holder is subsequently opened again. As soon as the activation of the holder has ended (S30: "Y"), the crossover switching device 4.2 switches to the position "①" again in Step S40 so that the robot goes into position regulation again.

If its pose has thereby changed (due to a yielding upon activation of the electrode holder) relative to the original pose taken up under position regulation, the abrupt specification of this originally adopted pose would lead to a large contouring error with corresponding regulation problems.

Therefore, to switch over to position regulation (4.2 ②→①), a current pose q is used as a desired pose $q_s$. For this the crossover switching device 4.1 switches over to the "②" setting in Step S40. In this the desired pose $q_s$ that is supplied to the regulator R is directed (over a predetermined time $\Delta t$) from the current pose q upon switching to the original pose $q_s$ taken up under position regulation, for example according to $$q_s = q \times (\Delta t - t)/\Delta t + q_{s,SPS} \times t/\Delta t$$

$$\Rightarrow q_s(t=0) = q;\ q_s(t=\Delta t) = q_{s,SPS}$$

If the pose $q_s$ of the regulation according to $\Delta t$ has reached the original pose $q_{s,\ SPS}$ taken up under position regulation (S50: "Y"), the crossover switching device 4.1 can switch over to position regulation again in Step S60.

The monitoring device 4 continuously monitors the deviation between the current pose q and the originally assumed pose $q_{s,\ SPS}$ during the activation of the electrode holder 2 and initiates an emergency stop if this exceeds a predetermined maximum value (not shown).

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for automated welding comprising the steps of:
   using a welding robot, comprising a plurality of articulated joints, to position an electrode holder to implement a welding procedure, said plurality of articulated joints allowing said welding robot to be configured into a plurality of different poses;

from a computerized control unit, regulating said welding robot to cause said welding robot to occupy a welding pose, that is among said plurality of different poses, during which said welding procedure occurs and, in said welding procedure, opening and closing said electrode holder; and from said computerized control unit, flexibly holding said welding pose during a time selected from the group consisting of during closing of said electrode holder, during said welding procedure, and during opening of said electrode holder.

2. A method as claimed in claim 1 comprising holding said electrode pose under control from said computerized control unit.

3. A method as claimed in claim 2 wherein said plurality of articulated joints of said welding robot occupy respective joint positions and have respective joint velocities, and implementing the controlled holding of said welding pose from said computerized control unit independently of said joint positions and joint velocities.

4. A method as claimed in claim 2 wherein said welding robot experiences predetermined forces acting thereon during said time, and wherein said computerized control unit is configured to automatically compensate for said predetermined forces to flexibly hold said welding pose.

5. A method as claimed in claim 1 wherein said plurality of articulated joints of said welding robot respectively occupy joint positions and respectively have joint velocities, and comprising resetting at least one of said joint positions and joint velocities from said computerized control unit to regulate said positioning device to occupy said welding pose.

6. A method as claimed in claim 1 comprising employing a current pose of said welding robot as a reference pose for regulating said positioning device after flexibly holding said welding pose.

7. A method as claimed in claim 1 comprising monitoring a current pose of said welding robot during said flexible holding of said welding pose.

8. A device for automated welding comprising:

a welding robot, comprising a plurality of articulated joints, with an electrode holder attached to one of said articulated joints, said welding robot being operable to implement a welding procedure, said plurality of articulated joints allowing said welding robot to be configured into a plurality of different poses;

a computerized control unit configured to regulate said welding robot to cause said welding robot to occupy a welding pose, that is among said plurality of different poses, during which said welding procedure occurs and, in said welding procedure, to open and close said electrode holder; and said computerized control unit being configured to flexibly hold said welding pose during a time selected from the group consisting of during closing of said electrode holder, during said welding procedure, and during opening of said electrode holder.

9. A non-transitory computer-readable storage medium encoded with programming instructions, said storage medium being loaded into a computerized control unit of an automated welding robot comprising an electrode holder, said welding robot comprising a plurality of articulated joints that allow said welding robot to be configured into a plurality of different poses, and said programming instructions causing said computerized control unit to:

regulate said welding robot to cause said welding robot to occupy a welding pose, that is among said plurality of different poses, during which a welding procedure occurs and, in said welding procedure, to cause opening and closing of said electrode holder; and cause said welding robot to flexibly hold said welding pose during a time selected from the group consisting of during closing of said electrode holder, during said welding procedure, and during opening of said electrode holder.

* * * * *